(12) United States Patent
Douglas

(10) Patent No.: US 6,553,631 B1
(45) Date of Patent: Apr. 29, 2003

(54) SQUARE TOOL WITH PENCIL CLIP

(75) Inventor: Dennis R. Douglas, Napa, CA (US)

(73) Assignee: Square One Products, Inc., Napa, CA (US)

( * ) Notice: Subject to any disclaimer, the term of this patent is extended or adjusted under 35 U.S.C. 154(b) by 0 days.

(21) Appl. No.: 10/052,819

(22) Filed: Nov. 8, 2001

(51) Int. Cl.⁷ .............................................. A44B 21/00
(52) U.S. Cl. ...................... 24/3.12; 224/269; 224/668
(58) Field of Search .................. 24/10 R, 11 R, 24/11 PP, 11 CT, 10 A, 3.11, 3.12; 33/420, 474, 479, 735; 224/668, 269, 272

(56) References Cited

U.S. PATENT DOCUMENTS

| | | |
|---|---|---|
| 1,720,471 A | 7/1929 | Fritsch |
| 2,583,142 A | 1/1952 | Frentzel |
| 3,101,075 A | 8/1963 | Johmann |
| 3,882,572 A | 5/1975 | Hocq |
| 4,111,343 A | 9/1978 | Selinko |
| 4,584,250 A | 4/1986 | Hooke et al. |
| 4,717,275 A | 1/1988 | Burkhardt, Jr. |
| 4,790,678 A | 12/1988 | Araki |
| 4,819,847 A * | 4/1989 | Anderson .................... 224/669 |
| 6,199,733 B1 * | 3/2001 | Reynolds, III .............. 224/269 |
| 6,233,789 B1 | 5/2001 | Douglas |
| 6,266,851 B1 * | 7/2001 | Lu .............................. 24/3.12 |
| 6,393,710 B1 * | 5/2002 | Hastings ...................... 33/484 |

FOREIGN PATENT DOCUMENTS

| | | |
|---|---|---|
| DE | 4310602 | 5/1994 |
| GB | 2213522 | 8/1989 |

* cited by examiner

*Primary Examiner*—Robert J. Sandy
(74) *Attorney, Agent, or Firm*—William Michael Hynes; Townsend and Townsend and Crew, LLP

(57) ABSTRACT

A square tool defining a triangular housing contains a tape measure, spirit level, and pencil sharpener. A triangular chassis is covered at a top triangular cover, a bottom triangular cover and contains the tape measure, spirit level, and pencil sharpener. The triangular chassis defines two sides intersecting at right angles with the hypotenuse closing the third side. A pencil clip having an arcuate pencil holding arm is provided. The arcuate pencil holding arm attaches to a pencil arm base, a trapped arm backing extending at 90° to the pencil arm base, and a chassis mounting clip extending along the underside of the triangular chassis.

6 Claims, 3 Drawing Sheets

SQUARE TOOL WITH PENCIL CLIP

This invention relates to a triangular square tool having two sides joined at right angles with the third side defining the case hypotenuse. Provision is made for mounting a pencil at the case hypotenuse. Typically, the triangular square tool contains a retractable ruler, a spirit level, and a pencil sharpener.

BACKGROUND OF THE INVENTION

In my Douglas U.S. Pat. No. 6,233,789 issued May 22, 2001 entitled Square Tool with Tape Measure, I disclose the concept of mounting a pencil along the hypotenuse of a universal square tool. The universal square tool included retractable tape measure, enclosed spirit level, and a recessed belt clip. All three sides of the tape measure define a generally flat side for abutment to a flat surface with a groove defined therebetween. While the concept of a pencil holder was disclosed, an apparatus and method for a fixing such a holder conveniently to the casing was not set forth. Accordingly, there follows in this disclosure, a pencil holder clip, which integrally conforms to the case and attaches during the sequence of the universal square tool assembly.

BRIEF SUMMARY OF THE INVENTION

A square tool defining a triangular housing contains a tape measure, spirit level, and pencil sharpener. A triangular chassis is covered at a top triangular cover, a bottom triangular cover and contains the tape measure, spirit level, and pencil sharpener. The triangular chassis defines two sides intersecting at right angles with the hypotenuse closing the third side. The top triangular cover and bottom triangular cover mount to the chassis so as to define upper and lower flat right angles surfaces with a defined groove therebetween. Medially of the hypotenuse side there is defined a pencil clip hypotenuse notch. A pencil clip having an arcuate pencil holding arm is provided. The arcuate pencil holding arm attaches to a pencil arm base, a trapped arm backing extending at 90° to the pencil arm base, and a chassis mounting clip extending along the underside of the triangular chassis. In assembly, the pencil clip is mounted to the pencil clip hypotenuse notch at the trapped arm backing so that the notch is flush with the hypotenuse side of the triangular chassis with the arcuate pencil holding arm extending over the hypotenuse at the defined groove. At the same time, the chassis-mounting clip extends under and in firm contact with the underside of the triangular chassis. Placement and fastening of the triangular top cover and triangular bottom cover effectively fastens the pencil clip in place to enable clip placement as an integral part of square tool assembly. As a result, a pencil may be firmly held by the clip hereto defined as a groove in a square tool along the hypotenuse.

DETAILED DESCRIPTION OF THE INVENTION

Figure 1:
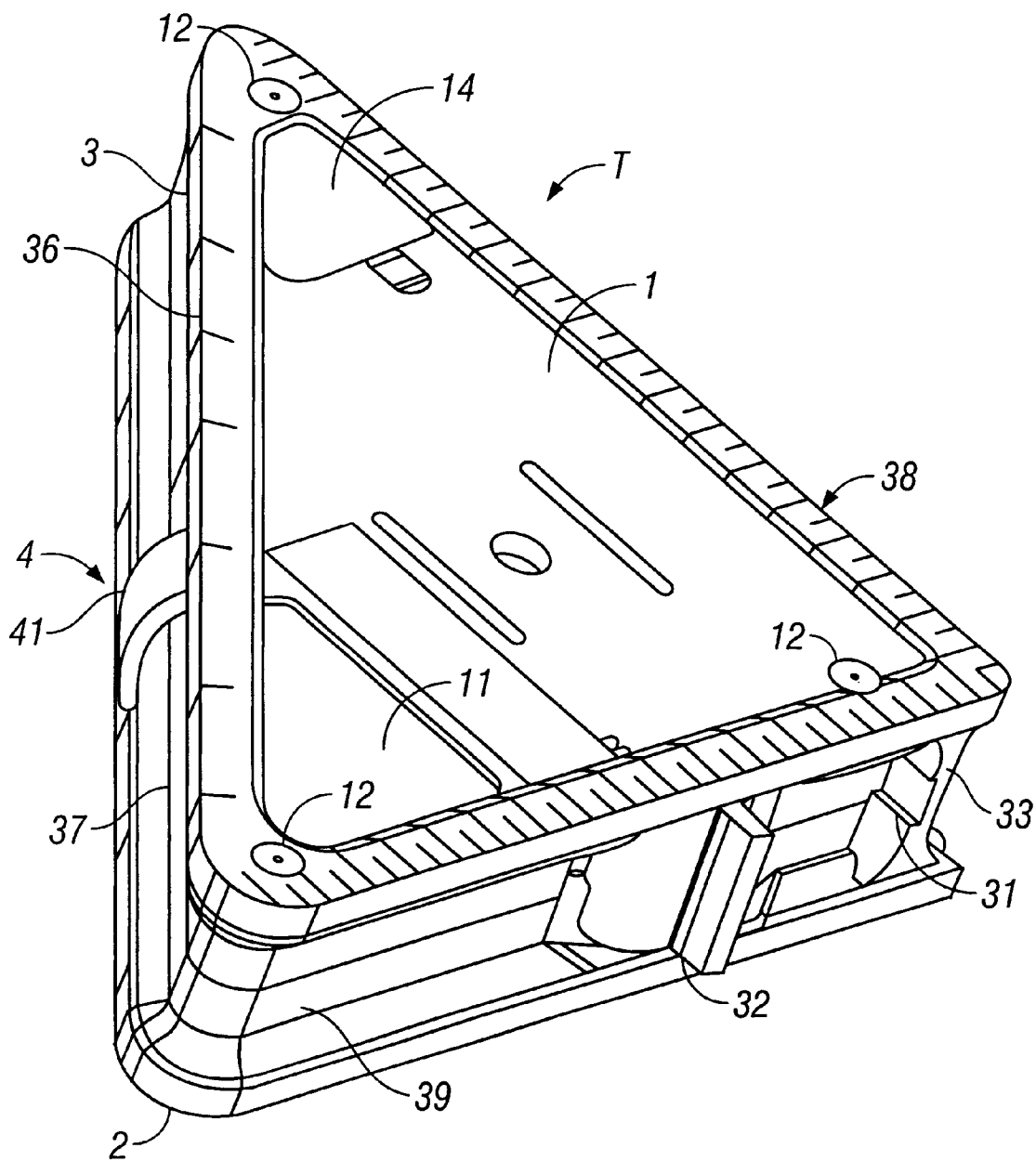
FIG. 1 is a perspective view of the assembled square tool illustrating the contained tape measure, spirit level pencil sharpener, and pencil holder.

Referring to FIG. 1, a perspective view of square tool T is shown. The square tool includes a triangular top cover 1, a triangular bottom cover 2, and a triangular chassis 3. As hereinafter set forth, assembly of triangular top cover 1 and triangular bottom cover 2 to triangular chassis 3 enables a pencil clip 4 to be disposed along the hypotenuse side 37 of the square tool T.

Examining triangular top cover 1, it will be seen that assembly of the square tool traps spirit level window 11 and pencil sharpener 15 within triangular chassis 3. Further, triangular chassis 34 has a small volume within the pencil sharpener 15 in which pencil shavings can be contained. A door 14 allows such shavings to be removed from the small volume interior of the triangular chassis 3.

Triangular chassis 3 contains retractable tape 31 and tape lock 32 as well as a tape guide to 33 to enable smooth extension and retraction of the retractable tape. Pencil clip hypotenuse notch 36 can be seen at the upper edge of hypotenuse side 37 of triangular chassis 3. First right side 38 of square tool T is hidden from view; second right side 39 can be seen.

It will be noted that both triangular top cover 1 and triangular bottom cover 2 have squared edges extending beyond the respective hypotenuse side 37, first right side 38, and second right side 39. Further, these respective sides are finished with square parallel surfaces. With this construction, the square tool can be registered to flat surfaces on all three sides.

Figure 3:
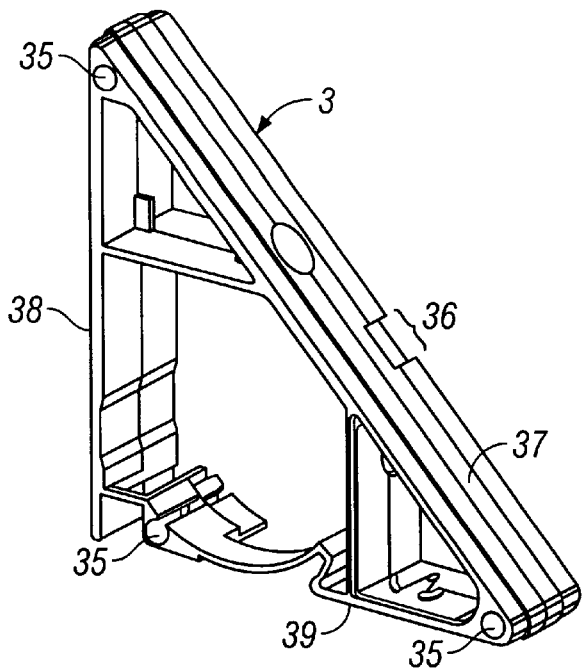
FIG. 3 is a perspective view of the triangular chassis illustrating in particular the chassis hypotenuse side configured with a pencil clip hypotenuse notch to enable firm trapping during square tool assembly; and, FIG. 4 is a perspective view on an increased scale of the pencil clip.

Referring to FIG. 3, a perspective view of triangular chassis 3 can be seen. Hypotenuse side 37 has a defined pencil clip hypotenuse notch 36. Fastening screw holes 35 are generally disposed at the three corners of the triangular chassis 3.

Figure 4:
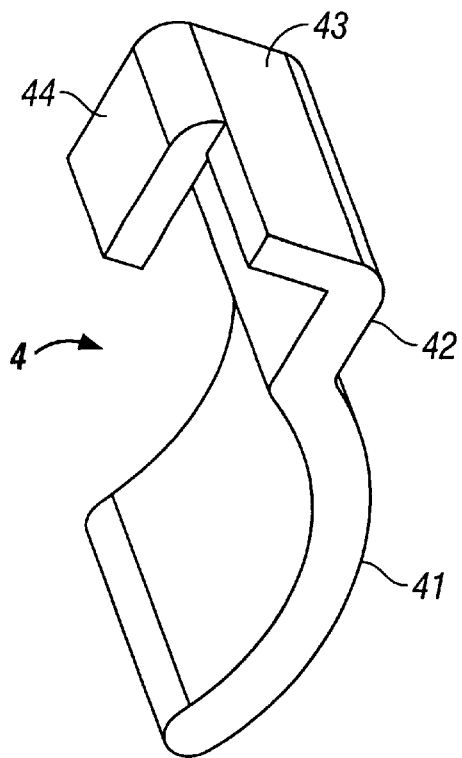

FIG. 4 is a perspective view of the pencil clip. The pencil clip includes an arcuate pencil holding arm 41. This arcuate arm grasps a pencil P (see FIG. 1) and maintains the pencil firmly grasped at the hypotenuse side 37 of triangular chassis 3. Such firm holding of the pencil is assisted by the defined grooves between triangular top cover 1 and triangular bottom cover 2.

Arcuate pencil holding arm 41 cantilevers from pencil arm base 42. Pencil arm base 42 in turn fastens trapped arm backing 43. Extending from trapped arm backing 43 parallel to pencil arm base 42 is chassis mounting clip 44. It can be seen that pencil arm base 42, trapped arm backing 43, and chassis mounting clip 44 form a generally U-shaped structure. As will hereinafter be set forth with respect to FIG. 2, this U-shaped structure grasps hypotenuse side 37 of triangular chassis 3 at pencil clip hypotenuse notch 36 to firmly hold pencil clip 4 in place.

Figure 2:
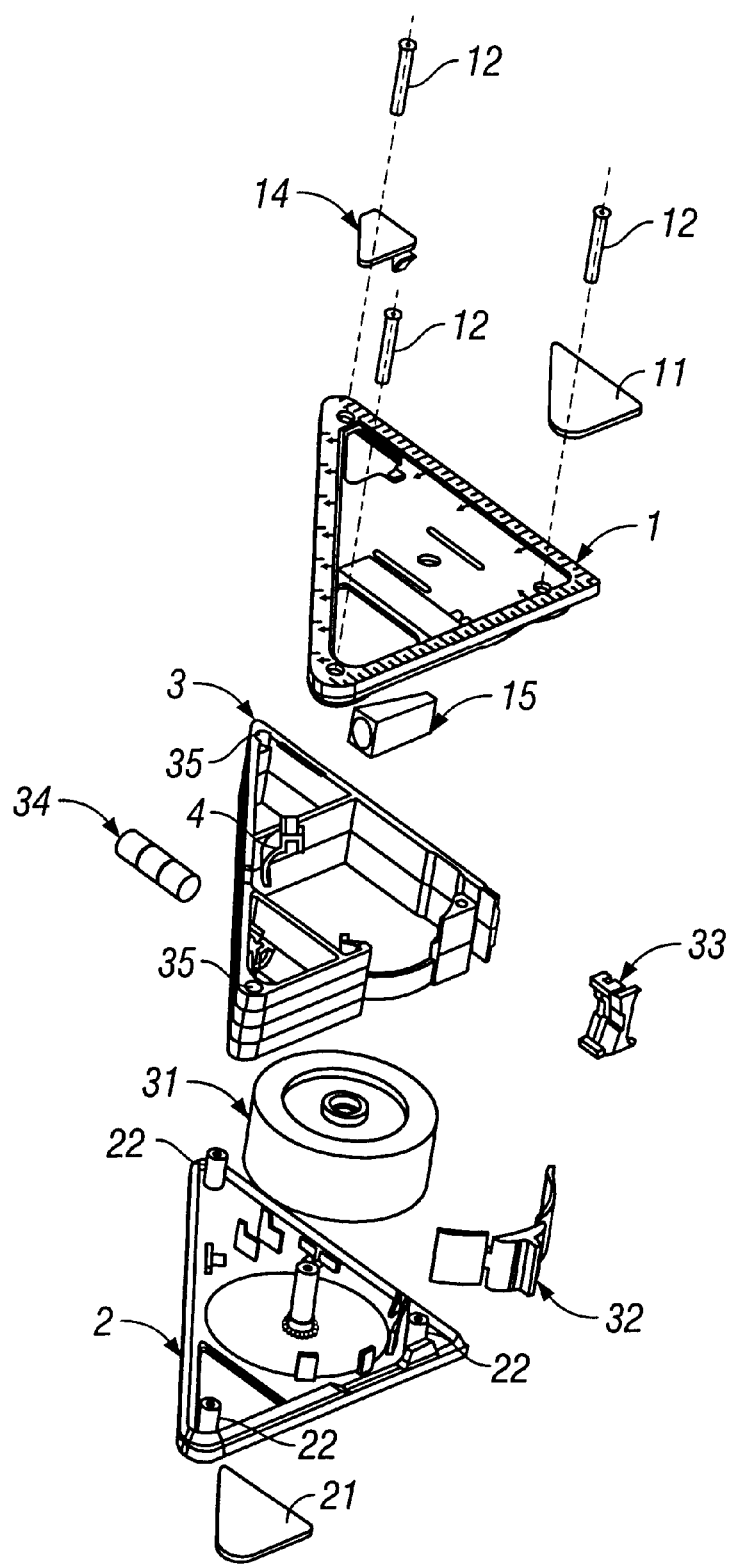
FIG. 2 is an exploded assembly view of the square tool illustrating the triangular chassis enclosing and containing the retractable tape, tape lock, tape guide, spirit level, pencil sharpener, and pencil clip.

Assembly of the square tool T can be readily understood with respect to the exploded view of FIG. 2. Triangular chassis 3 has retractable tape 31, spirit level 34, pencil sharpener 15, retractable tape lock 32, and tape guide 33 all placed within the volume of the triangular chassis.

At this point pencil clip 4 is clipped to triangular chassis 3 at pencil clip hypotenuse notch 36. Pencil arm base 42 is deployed on the outside of hypotenuse side 37. Chassis mounting clip 44 is deployed on the inside of hypotenuse side 37. Trapped arm backing 43 fills in and completely occupies pencil clip hypotenuse notch 36. It will be understood that arcuate pencil holding arm 41 is disposed over hypotenuse side 37 of triangular chassis 3 on the outside. It will be seen that the remaining steps of square tool T assembly effectively hold and maintain pencil clip 4 with arcuate pencil holding arm 41 in a pencil holding disposition over the hypotenuse side 37 of the triangular chassis 3.

Thereafter, triangular top cover 1 and triangular bottom cover 2 have their respective spirit level windows 11, 21 placed and captured on the respective chassis side of the covers. Once these windows are in place, triangular top cover 1 and triangular bottom cover 2 are registered to triangular chassis 3. This effectively captures the retractable tape 31, spirit level 34, pencil sharpener 15, tape lock 32, and tape guide 33 to the square tool T. Fastening screw screws 12 are then employed passing through triangular top cover 1, fastening screw holes 35 in triangular chassis 3, fastening to screw columns 22 in triangular bottom cover 2. Finally, door 14 is placed adjacent pencil sharpener 15 to cover the small defined volume in triangular chassis 3 about the pencil sharpener.

Mount of the pencil clip 4 can occur into hypotenuse notch 36 on the chassis 3. The reader will appreciate that both the configuration of the clip and that of the channel and/or notch can be altered so long as a firm interconnection remains. For example, the channel and/or notch can be on the inside and/or the outside of the chassis.

What is claimed is:

1. A square tool comprising in combination:
   a triangular chassis having first and second sides disposed at right angles with an hypotenuse side forming a generally triangular enclosed volume;
   at least one triangular cover for closing a side of the triangular chassis;
   a pencil clip hypotenuse notch defined at an edge of the hypotenuse side of the triangular chassis;
   a pencil clip including an arcuate pencil holding arm attached to a pencil arm base; and,
   a trapped arm backing for filling the pencil clip hypotenuse notch, the trapped arm backing fastened to the pencil arm base on one side, a chassis mounting clip on the opposite side to form a generally U-shaped closure about the hypotenuse side of the triangular chassis at the hypotenuse notch to dispose the arcuate pencil holding arm overlying the hypotenuse side of the triangular chassis and underlying the at least one triangular cover.

2. The square tool of claim 1 and wherein:
   the at least one triangular cover includes a top triangular cover for closing one side of the triangular chassis and a bottom triangular cover for closing the bottom side of the triangular chassis.

3. The square tool of claim 2 and wherein:
   the triangular top cover and the triangular bottom cover extend beyond the sides of the triangular chassis to define a recessed groove at the triangular chassis on all sides of the square tool.

4. The square tool of claim 2 and wherein:
   the triangular top cover and the triangular bottom cover define squared edges registered at right angles one to another whereby the covers can simultaneously abut flat surfaces registered to the side edges of the top and bottom covers.

5. The square tool of claim 4 and wherein:
   the square edges extend beyond the triangular chassis to define a groove therebetween.

6. A process of assembling a square tool comprising the steps of:
   providing a triangular chassis having first and second sides disposed at right angles with an hypotenuse side forming a generally triangular enclosed volume;
   providing generally at least one triangular cover for closing over the triangular chassis to enclose the generally triangular enclosed volume;
   defining a pencil clip hypotenuse notch at an edge of the hypotenuse side of the triangular chassis;
   providing a pencil clip including an arcuate pencil holding arm attached to a pencil arm base, the pencil arm base attached to a trapped arm backing for filling the pencil clip hypotenuse notch on one side and a chassis mounting clip on the opposite side to form a generally U-shaped closure about the hypotenuse side of the triangular chassis at the hypotenuse notch;
   placing a pencil clip at the trapped arm backing to enable filling of the hypotenuse notch by the trapped arm backing with the chassis mounting clip extending to the inside of the triangular chassis and the pencil arm base extending to the exterior of the triangular chassis whereby the arcuate pencil holding arm is disposed overlying the exterior of the hypotenuse side of the triangular chassis to dispose the arcuate pencil holding arm exterior of the triangular chassis at the hypotenuse side; and,
   after said placing step enclosing the triangular chassis with the at least one triangular cover to trap the pencil holding clip within the hypotenuse notch of the triangular chassis.

\* \* \* \* \*